July 21, 1925.
O. J. ST. PIERRE
1,546,805
SLED
Filed July 5, 1923
2 Sheets-Sheet 1
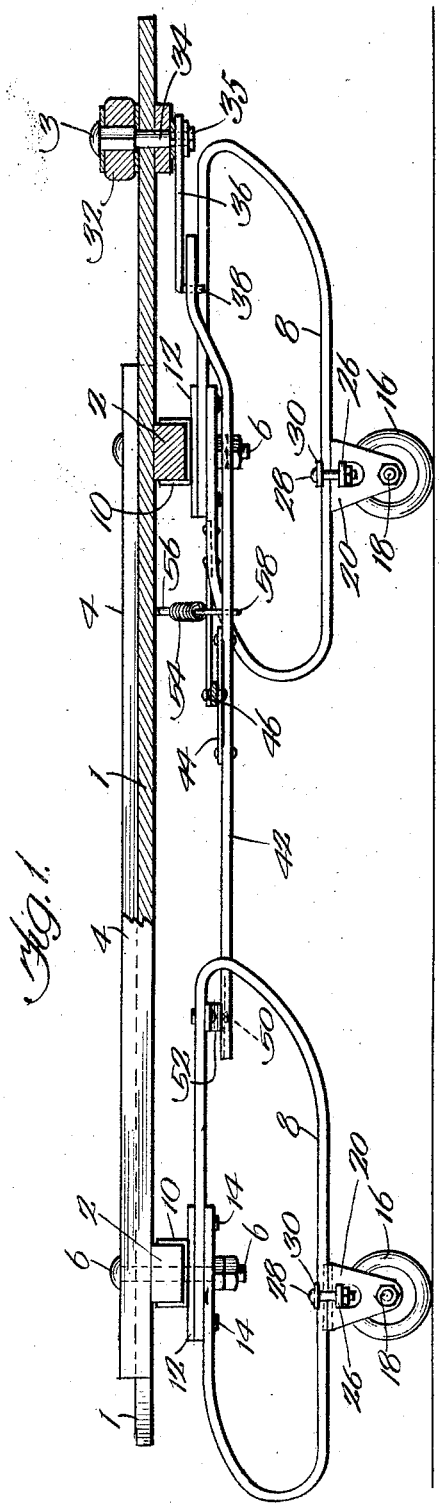
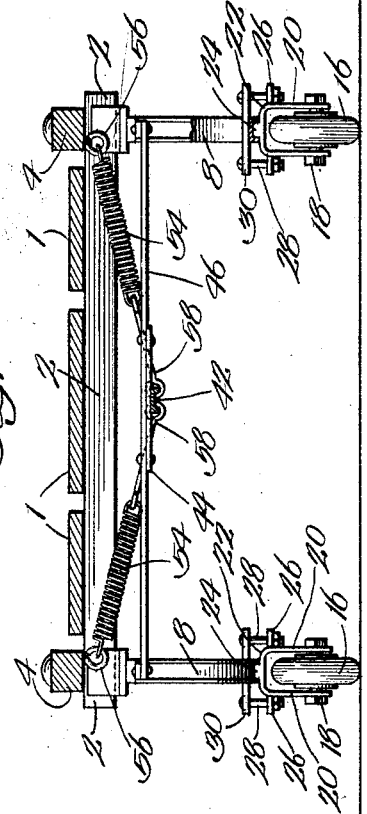
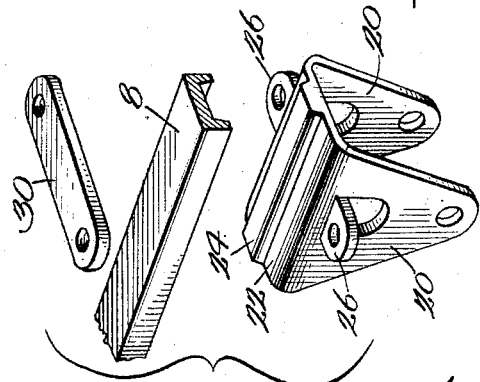
Inventor:
Octave J. St Pierre
By Cheever & Cox
Attys.

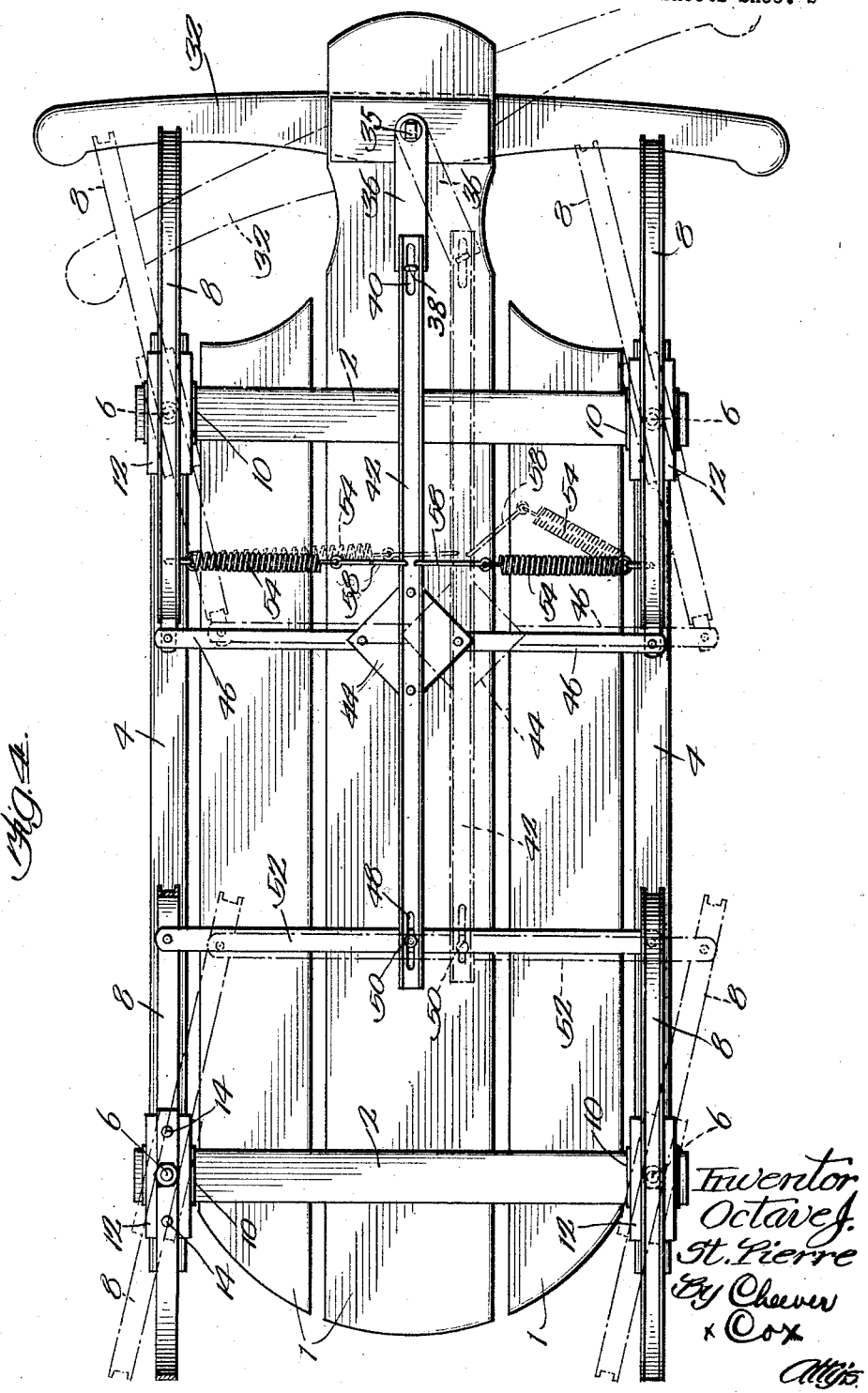

Patented July 21, 1925.

1,546,805

UNITED STATES PATENT OFFICE.

OCTAVE J. ST. PIERRE, OF CHICAGO, ILLINOIS.

SLED.

Application filed July 5, 1923. Serial No. 649,444.

*To all whom it may concern:*

Be it known that I, OCTAVE J. ST. PIERRE, a subject of the King of England, residing at Chicago, in the county of Cook and State of Illinois, have invented a certain new and useful Improvement in Sleds, of which the following is a specification.

My invention relates to sleds, and one of the objects is to provide steering mechanism which may be safe in the hands of a person located on the sled. In other words, it is my purpose to provide steering mechanism which may be operated by a person on the sled and which will be sensitive so that the sled may be quickly turned toward the right or left and which will at the same time be safe in case one of the runners hits an obstruction or tends to be deflected from any other cause. Another object is to provide steering mechanism having a simple form of reduction gear whereby a given angular movement of the manually operated controlling element will produce a smaller angular movement of the runners. Another object is to provide a construction in which all four of the runners are individually pivoted to the sled body and the steering gear will simultaneously rotate the front pair of runners in one direction and simultaneously rotate the rear runners in the opposite direction to thereby multiply the steering effect. Still another object is to provide a steering gear which tends automatically to return the runners to normal position lengthwise of the sled so that the steering apparatus if left alone will right the runners and cause the sled to travel straight ahead. A further and general object is to make the steering gear strong, light and sensitive and of comparatively few parts.

I obtain my objects by the mechanism illustrated in the accompanying drawings in which—

Figure 1 is a side elevation of the complete sled, part of the body being in section.

Figure 2 is a cross sectional elevation.

Figure 3 is a detail view showing the chief elements comprising the roller mounting.

Figure 4 is a bottom plan view of the sled.

Like numerals denote like parts throughout the several views.

The body of the sled may assume various forms. In the present case it consists of longitudinal boards 1 secured by cross braces 2, the center board projecting forward to carry the steering post 3. In addition to the boards 1 it is desirable to have heavier side members 4 at the lateral margins of the body.

At each of the four corners of the body is a pivot bolt 6 which extends down through the side members 4 and forms a pivot for the runners. The runners may be variously configurated, but an advantageous form is illustrated in which each shoe 8 consists of a closed, elongated loop of channel iron, the ends overlapping and fastened together by bolts or rivets 14. The lower run of the shoe forms the portion which slides upon the snow or ice. While the fastening devices are susceptible of considerable change it is advantageous to employ clips 10 in which the cross bars 2 seat and through which the pivot bolts 6 pass. These clips form wearing pieces so that the runners will be always free to rotate without much friction and wear will be reduced to a minimum. If desired a plate 12 may be secured to the overlapped portions of the shoe for purposes of reinforcement and to increase the amount of surface upon which the clip 10 may bear.

Referring now to the rollers and the means whereby they may be mounted on the shoes to enable the sled to roll upon the ground:

The rollers 16 are mounted upon axles 18 which are secured horizontally in the side plates 20 of the arch shaped frames shown in detail in Figure 3. The top 22 of each frame by preference has a rib 24 adapted to fit into the channel on the under side of the shoe. Ears or lugs 26 extend laterally from the side plates 20 and these are apertured to accommodate bolts 28 by which the frames may be bolted to the runner shoes. The upper end of the bolts 28 are supported in bars 30 which overlie the lower run of the shoe 8. These parts are shown separated but in related positions in Fig. 3. It will be evident that when the parts are assembled the construction will be quite firm and rigid, and the rib 24 will prevent the roller frame from becoming displaced. It is desirable that the lugs 26 be struck from the metal of the frame itself, thus simplifying the construction and imparting a workmanlike appearance. It is obvious that the rollers may be quickly attached or detached, for all that is necessary is to apply or remove the bar 30 and bolts 28.

Referring now to the steering gear: The steering bolt 3 previously mentioned has a squared upper portion which fits into the steering bar 32. This bar extends crosswise of the sled and may be engaged either by the feet or the hands of the person steering. The mid portion 34 of the steering post is cylindrical so that it may rotate freely in the body of the sled. Beneath the cylindrical portion is another squared portion 35 which is fastened to a steering arm 36. This extends rearward a short distance, and at the rear end has a tongue 38 which works in a slot 40 extending lengthwise in the median bar 42. This median bar extends rearward for a considerable portion of the length of the sled, and at its mid portion has a plate 44 riveted to it. Connecting links 46 lead from plate 44 to the rear ends of the forward runners swinging them about their pivots 6.

At the rear end bar 42 has a slot 48 for receiving a pin 50 which is secured to a link 52. This link is pivotally connected at its outer ends to the forward ends of the rear runners. The result of this construction is that when the operator rotates the steering bar 32 about steering post 34 as an axis, it will swing the steering arm 36 and shift the median bar 42 laterally. In Figure 4 the normal or straight line position of bar 42 is shown in full lines. In dotted lines it is shown in one of its extreme lateral positions. As this bar is connected to the rear end of the forward runners and the forward end to the rear runners the runners will always rotate in opposite directions and the steering effect will be amplified.

Means are provided for righting the steering gear. These include helical tension springs 54. The outer end of each spring is secured to an eye 56 screwed or otherwise secured to the side bars 4 as best shown in Figure 2. The inner end of each spring is connected by a link 58 to bar 42. When the bar is shifted laterally it will put one of the springs under tension and hence when the operator releases the steering bar 32 the tension of this spring will return the median bar to central position and the runners to straight ahead position.

The operation will now be readily understood. If the rollers are in place the sled may be used upon the ground although it will have the general appearance of the ordinary winter time sled and hence is of especial interest to children. If snow or ice is available the sled can slide upon it in the usual manner, the only thing necessary to convert from a rolling to sliding sled being to remove the bolts 28 and take away the frames 20 and rollers 16. This can be quickly done by the aid of a wrench.

As to steering, the bar 32 with which the sled is equipped is not unlike the bars commonly used on bob sleds. With my device, however, the bar instead of being fastened rigidly to the front pair of runners is connected to both pairs of runners by the steering gear, which not only controls the front pair but controls also the rear pair in such manner as to enhance the steering effect by rotating the front pair in one direction and the rear pair in the opposite direction.

The steering mechanism operates as well for the rollers as it does for the runners, and hence the steering mechanism is always available whether the sled be used in summer or winter.

It will be noted that the steering mechanism is of simple construction and that it is light, durable and makes the sled highly responsive to movements of the steering bar 32. The median bar 42 always remains parallel to its normal position. This is due to the way in which it is linked to the runners, the construction being similar to what is sometimes called a "parallel motion link work".

It will be observed by reference to Figure 4 and comparing the full line position with the dotted line position that a given angular movement of the steering bar produces a smaller angular movement of the runners about their pivots. In other words, the movement is reduced and thus the mechanism which connects the steering bar with the runners may be regarded as a reduction gear.

The fact that the runners, especially of the forward pair, are individually pivoted to the sled body at a point between their ends is of great practical advantage also, especially with respect to the safety which results to the person on the sled. If one of the runners hits an obstruction the shock will be resisted largely if not entirely by the pivot bolt 6 which secures the runner to the sled body. In the case of the ordinary bobsled where the two front runners are rigidly secured together and rotate as a unit about a bolt located at the center line of the sled the turning moment is so great when a runner hits an obstruction that the operator is apt to lose control. In my sled this danger is practically eliminated.

Having thus described my invention what I claim as new and desire to secure by Letters Patent is:

1. A vehicle including a body and two forward and two rear body supporting members individually pivoted thereto, a cross link connecting the two forward supporting members, a second cross link connecting the two rear supporting members, a rigid one piece bar connecting said links, and means for shifting said bar laterally thereby to move said links lengthwise to effect angular steering movements of said supporting members about their pivots.

2. A vehicle including a body and two forward and two rear body supporting members individually pivoted thereto, a cross link connecting the two forward supporting members, a second cross link connecting the two rear supporting members, a rigid one piece bar rigidly connected to one of said cross links and flexibly connected to the other, and means for shifting said bar laterally thereby to move said links lengthwise to effect angular steering movements of said supporting members about their pivots.

In witness whereof, I have hereunto subscribed my name.

OCTAVE J. ST. PIERRE.